(12) United States Patent
Iwase

(10) Patent No.: US 10,698,247 B2
(45) Date of Patent: Jun. 30, 2020

(54) DISPLAY APPARATUS, DISPLAY UNIT, AND TRANSPARENT PLATE UNIT

(71) Applicant: Sony Corporation, Tokyo (JP)

(72) Inventor: Nobutake Iwase, Tokyo (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 15/770,306

(22) PCT Filed: Sep. 15, 2016

(86) PCT No.: PCT/JP2016/077276
§ 371 (c)(1),
(2) Date: Apr. 23, 2018

(87) PCT Pub. No.: WO2017/081940
PCT Pub. Date: May 18, 2017

(65) Prior Publication Data
US 2018/0335662 A1    Nov. 22, 2018

(30) Foreign Application Priority Data
Nov. 9, 2015    (JP) .................................. 2015-219555

(51) Int. Cl.
*G02F 1/1335* (2006.01)
*G09F 9/00* (2006.01)
*H04N 13/305* (2018.01)
*G02F 1/1333* (2006.01)
*G02B 30/27* (2020.01)

(52) U.S. Cl.
CPC .. *G02F 1/133512* (2013.01); *G02F 1/133308* (2013.01); *G09F 9/00* (2013.01); *H04N 13/305* (2018.05); *G02B 30/27* (2020.01); *G02F 2001/133331* (2013.01); *H04N 2213/001* (2013.01)

(58) Field of Classification Search
None
See application file for complete search history.

(56) References Cited

U.S. PATENT DOCUMENTS

| 8,310,649 B2 | 11/2012 | Niiyama et al. |
| 2009/0033846 A1 | 2/2009 | Yamada et al. |
| 2010/0043965 A1 | 2/2010 | Kamiya et al. |
| 2012/0183721 A1* | 7/2012 | Niiyama ............. C08F 290/067 428/76 |

(Continued)

FOREIGN PATENT DOCUMENTS

| JP | 03-204616 | 9/1991 |
| JP | H03204616 A | 9/1991 |

(Continued)

OTHER PUBLICATIONS

International Search Report corresponding to PCT/JP2016/077276, dated Dec. 13, 2016 (3 pgs.).

*Primary Examiner* — Phu Vu
(74) *Attorney, Agent, or Firm* — Lerner, David, Littenberg, Krumholz & Mentlik, LLP

(57) ABSTRACT

Provided is a light emitting apparatus having a structure suitable for improvement in production yield. This light emitting apparatus includes a display panel, a transparent plate including an opposite surface that faces the display panel, and a light shielding layer provided in a peripheral part of the opposite surface of the transparent plate.

14 Claims, 16 Drawing Sheets

(56) References Cited

U.S. PATENT DOCUMENTS

2013/0027629 A1* 1/2013 Kiyohara .......... G02F 1/133308
349/58

FOREIGN PATENT DOCUMENTS

| | | |
|---|---|---|
| JP | 06-337411 A | 6/1994 |
| JP | 2005055641 A | 3/2005 |
| JP | 2008281997 A | 11/2008 |
| JP | 2011007830 A | 1/2011 |
| JP | 2012113228 A | 6/2012 |
| JP | 2014235185 A | 12/2014 |
| JP | 2015147916 A | 8/2015 |
| WO | 2007007689 A1 | 1/2007 |
| WO | 2011037035 A1 | 3/2011 |

* cited by examiner

[FIG. 1]
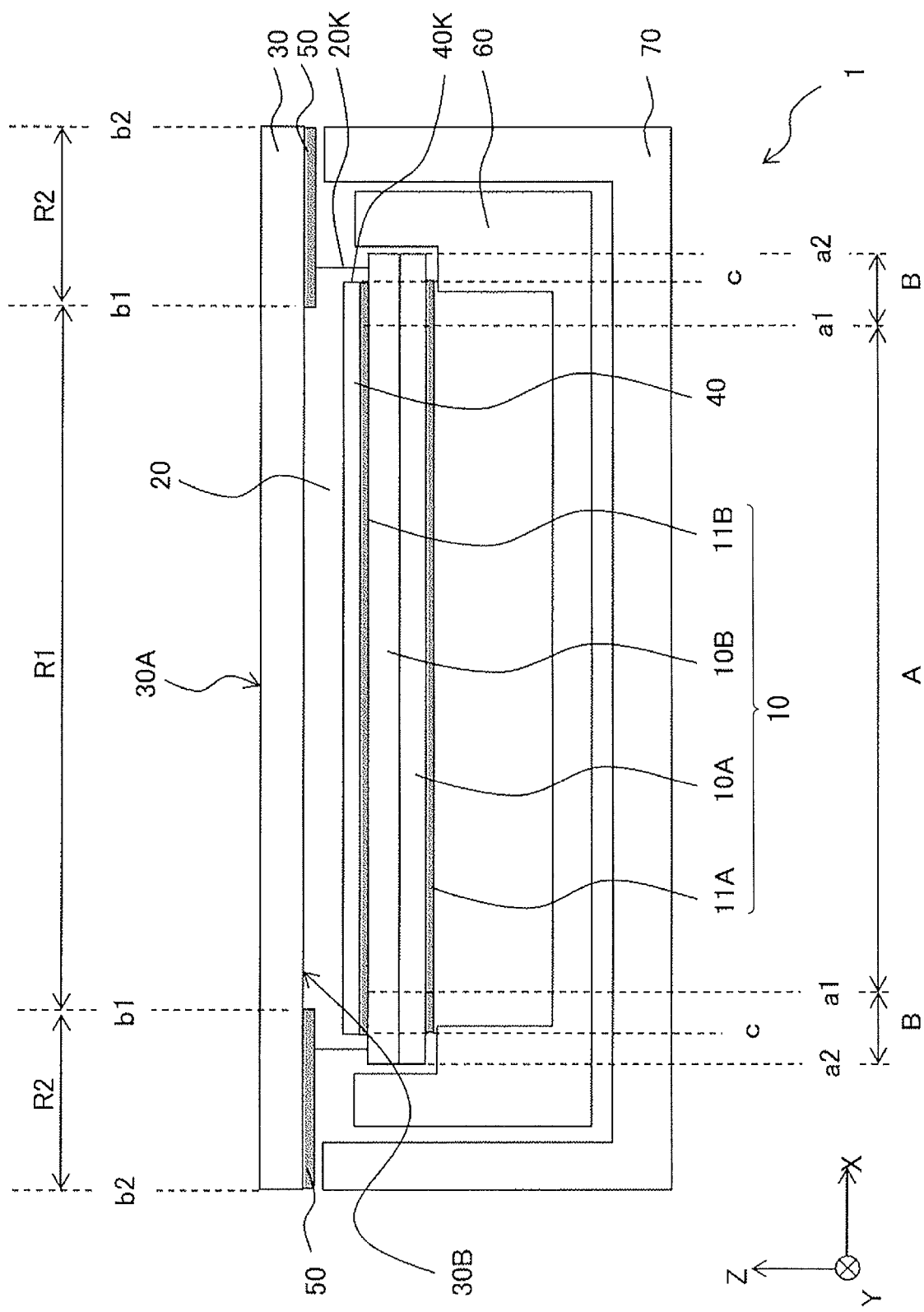

[FIG. 2]
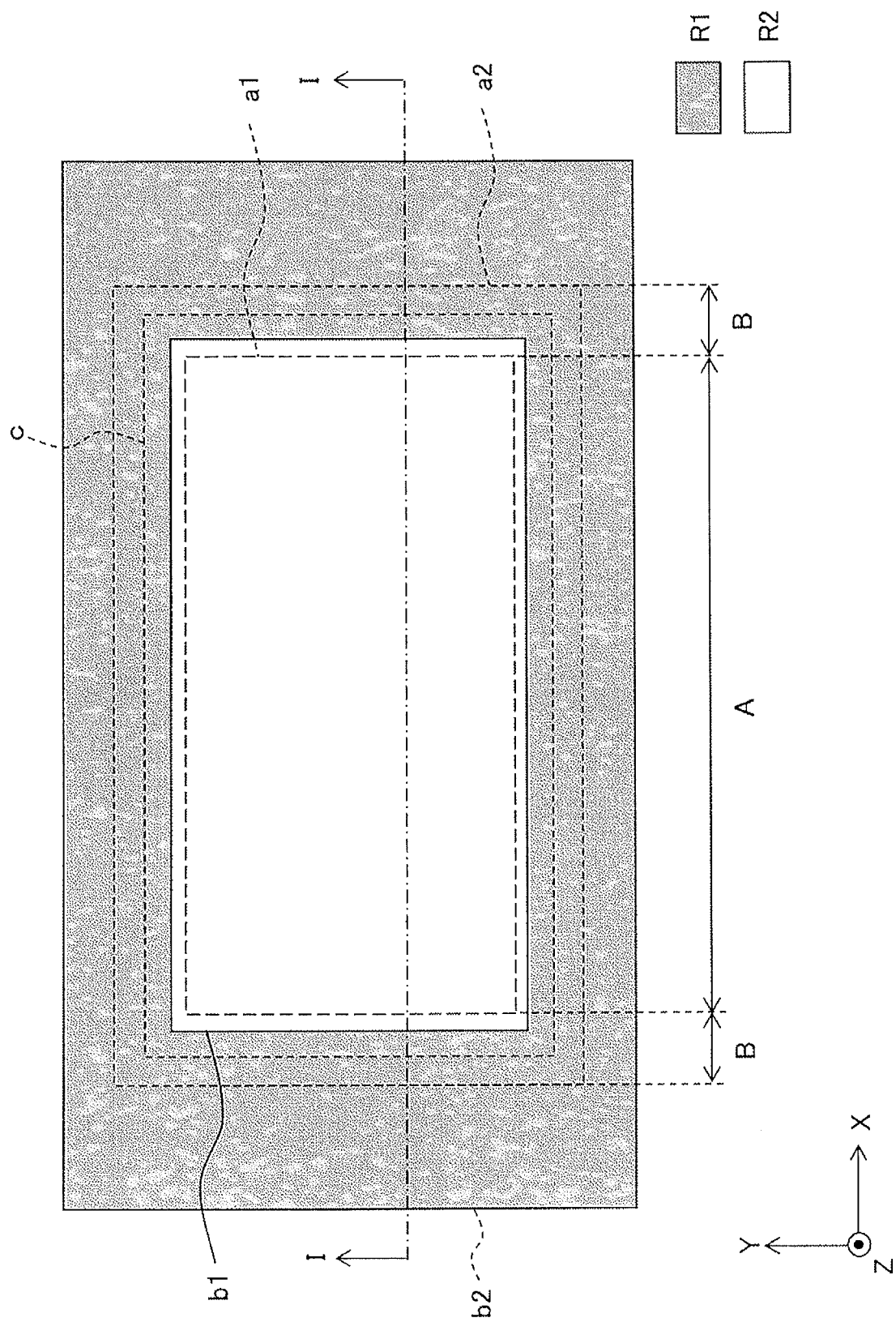

[ FIG. 3 ]
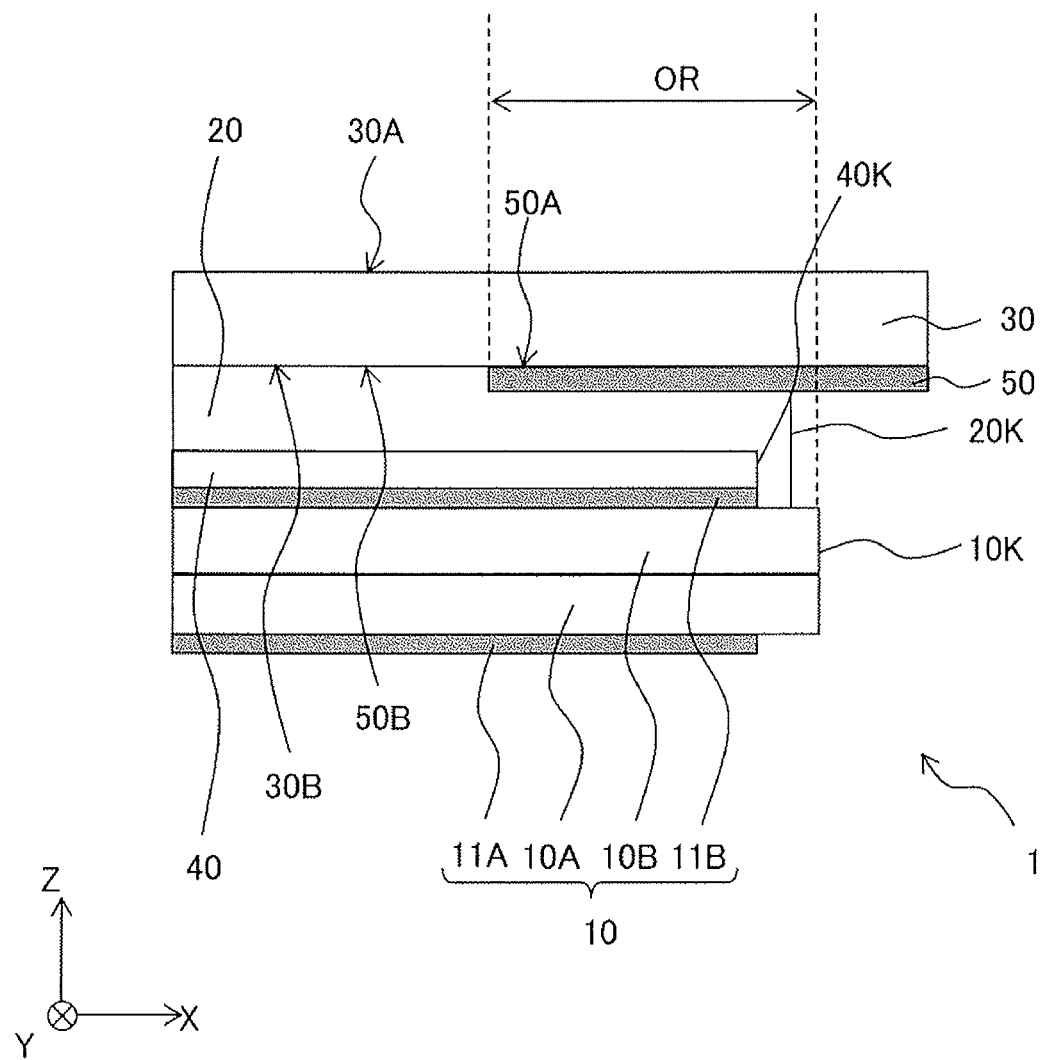

[ FIG. 4A ]
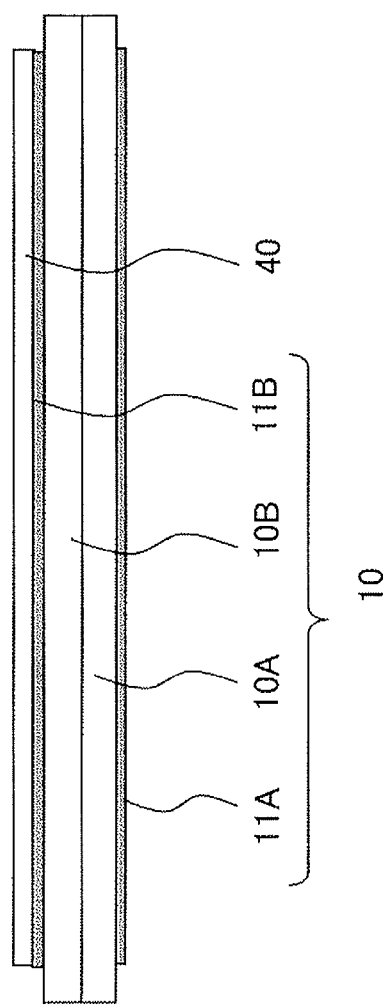

[ FIG. 4B ]
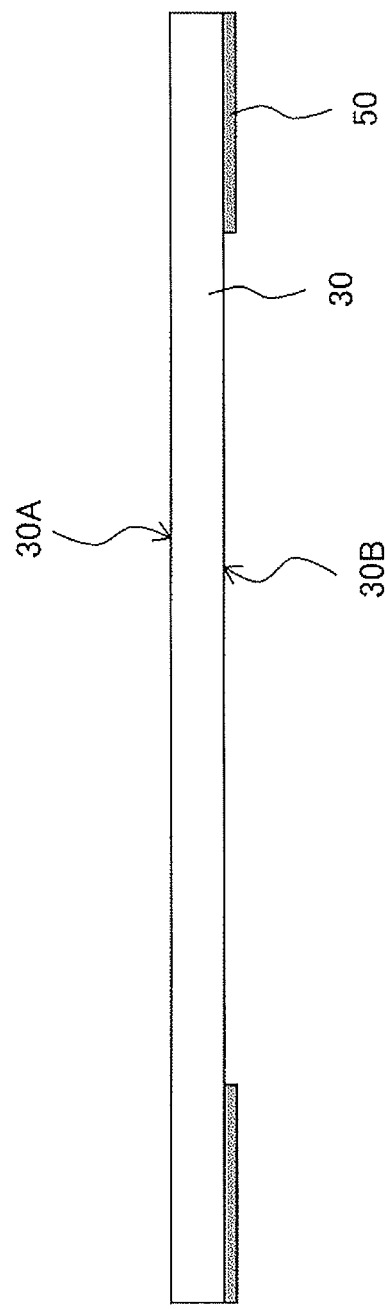

[FIG. 4C]
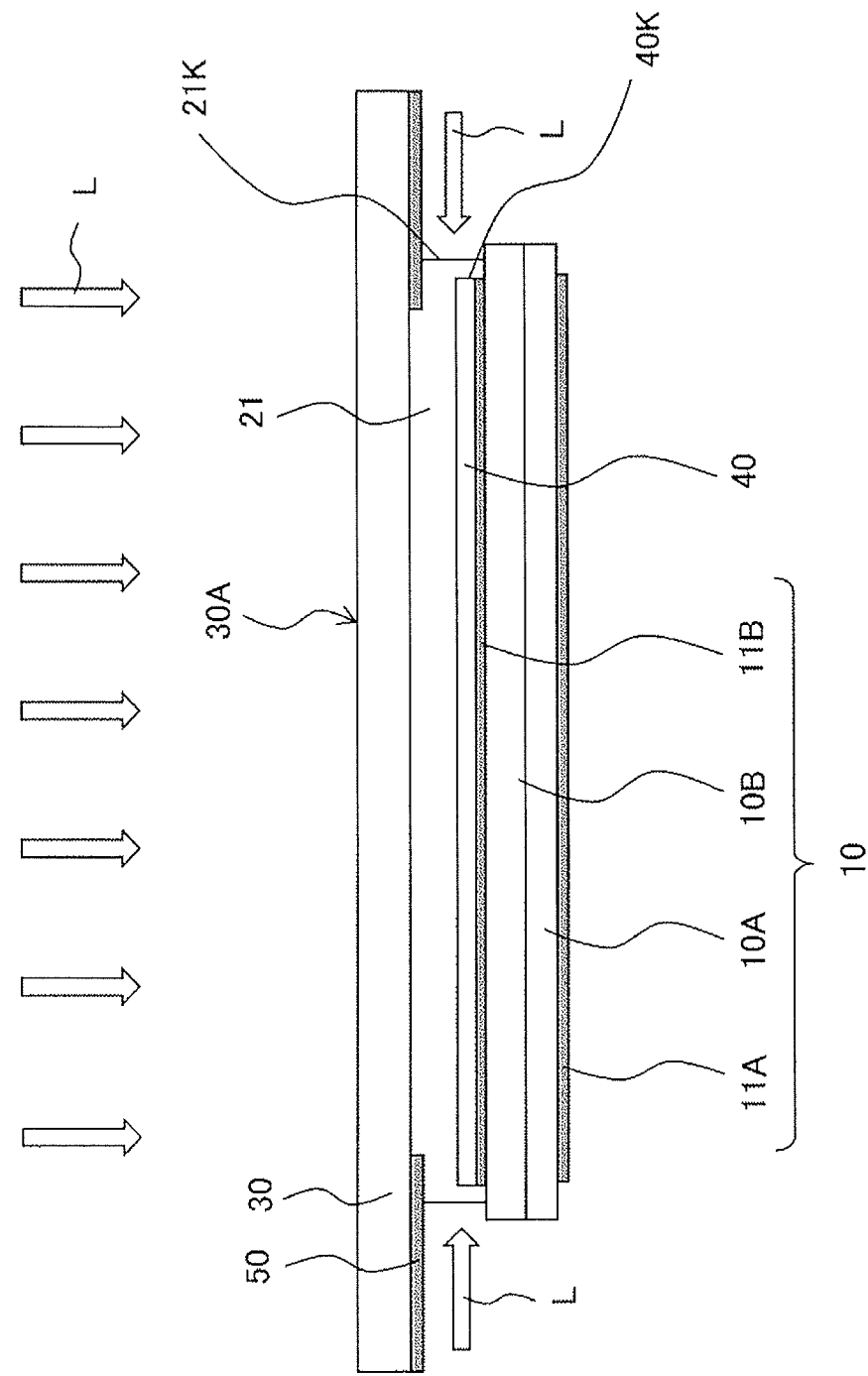

[FIG. 4D]
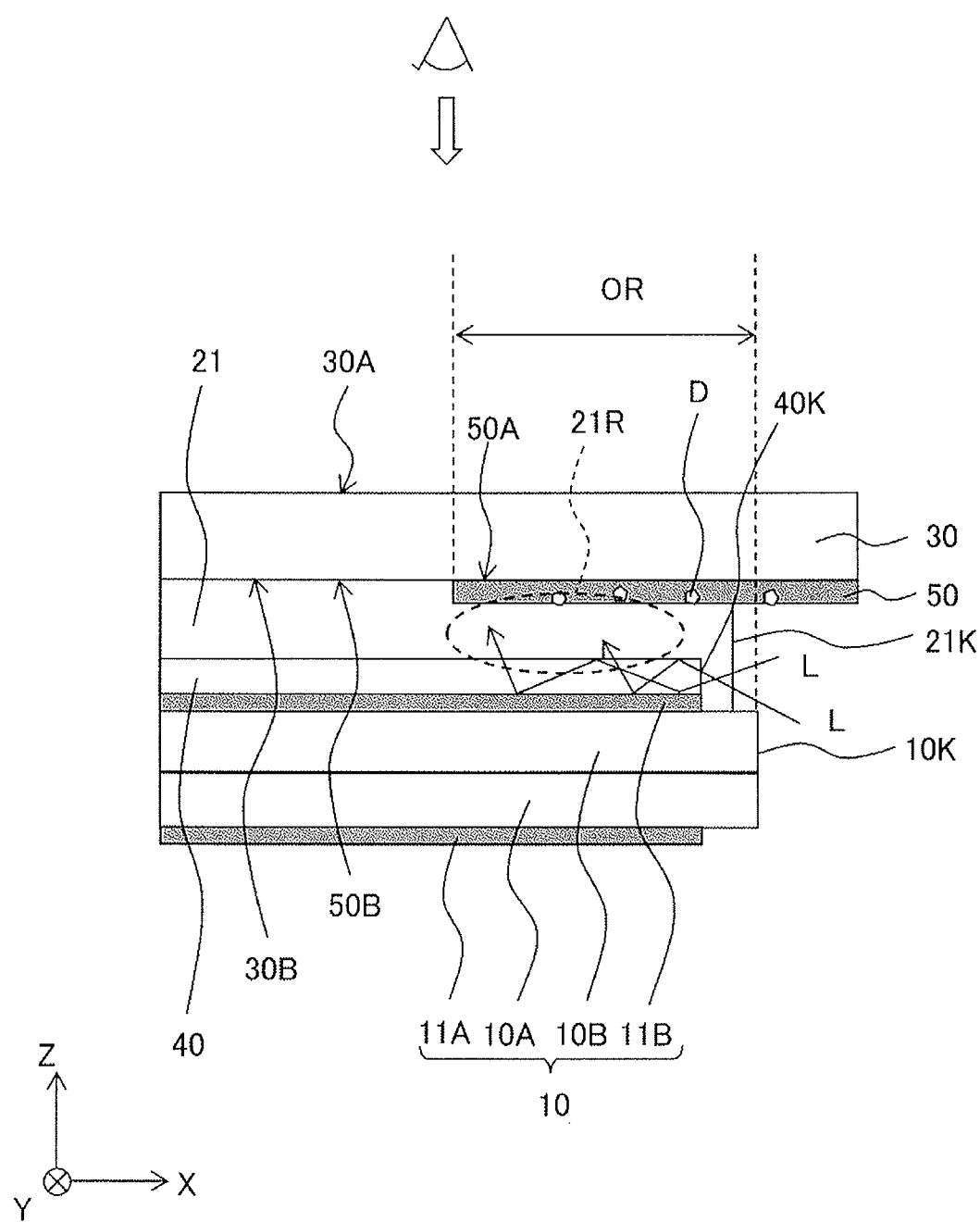

[ FIG. 5 ]
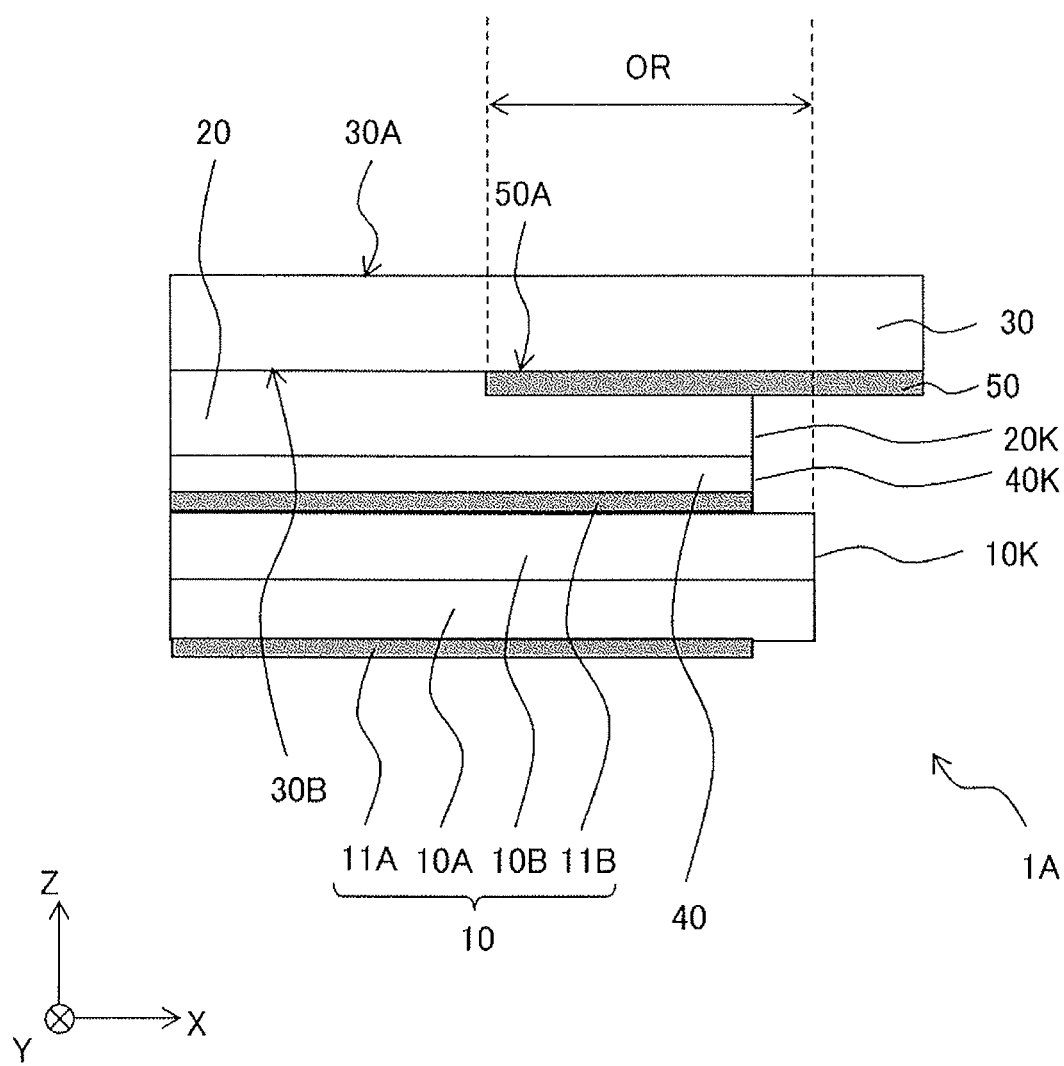

[ FIG. 6A ]
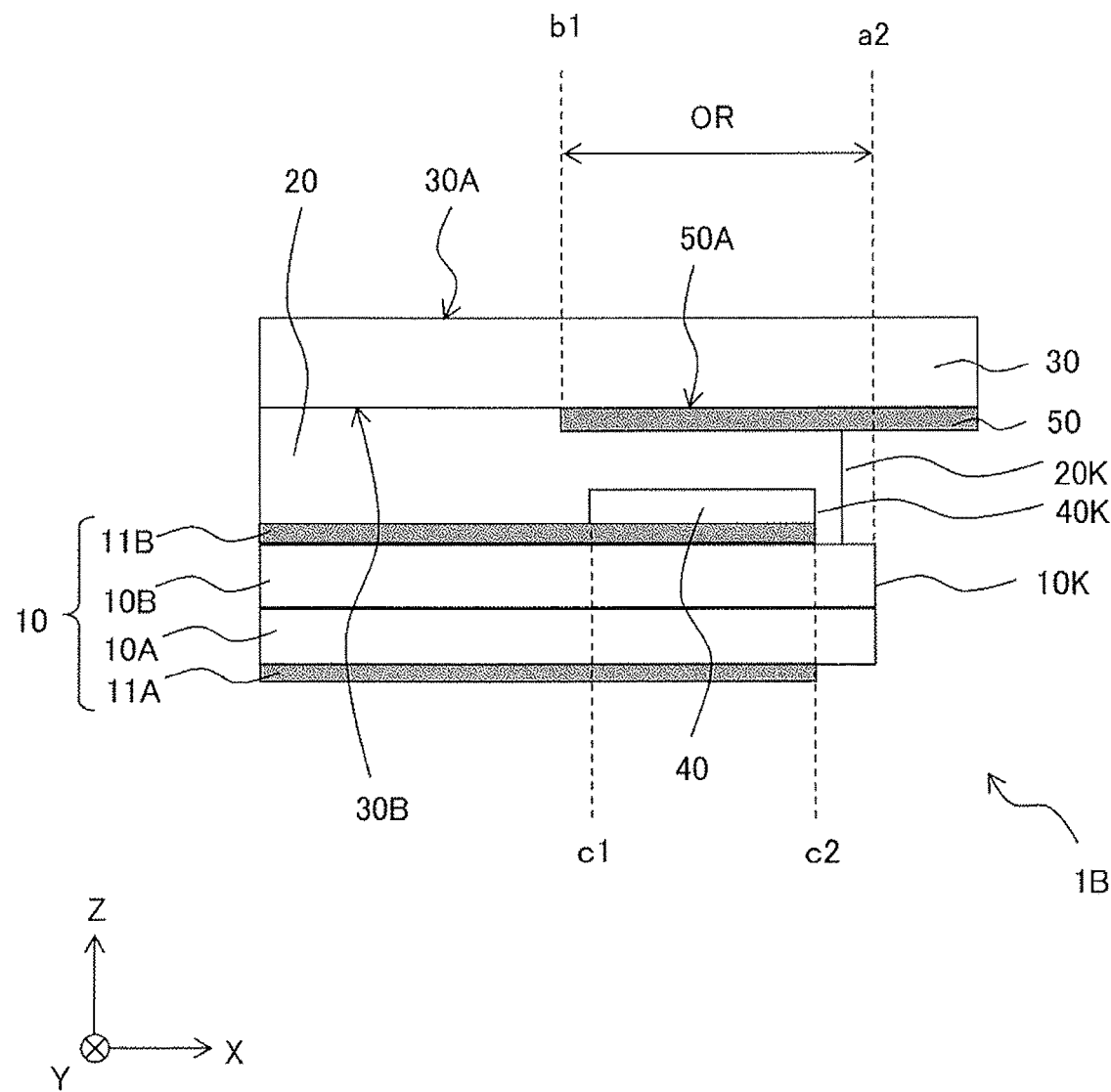

[FIG. 6B]
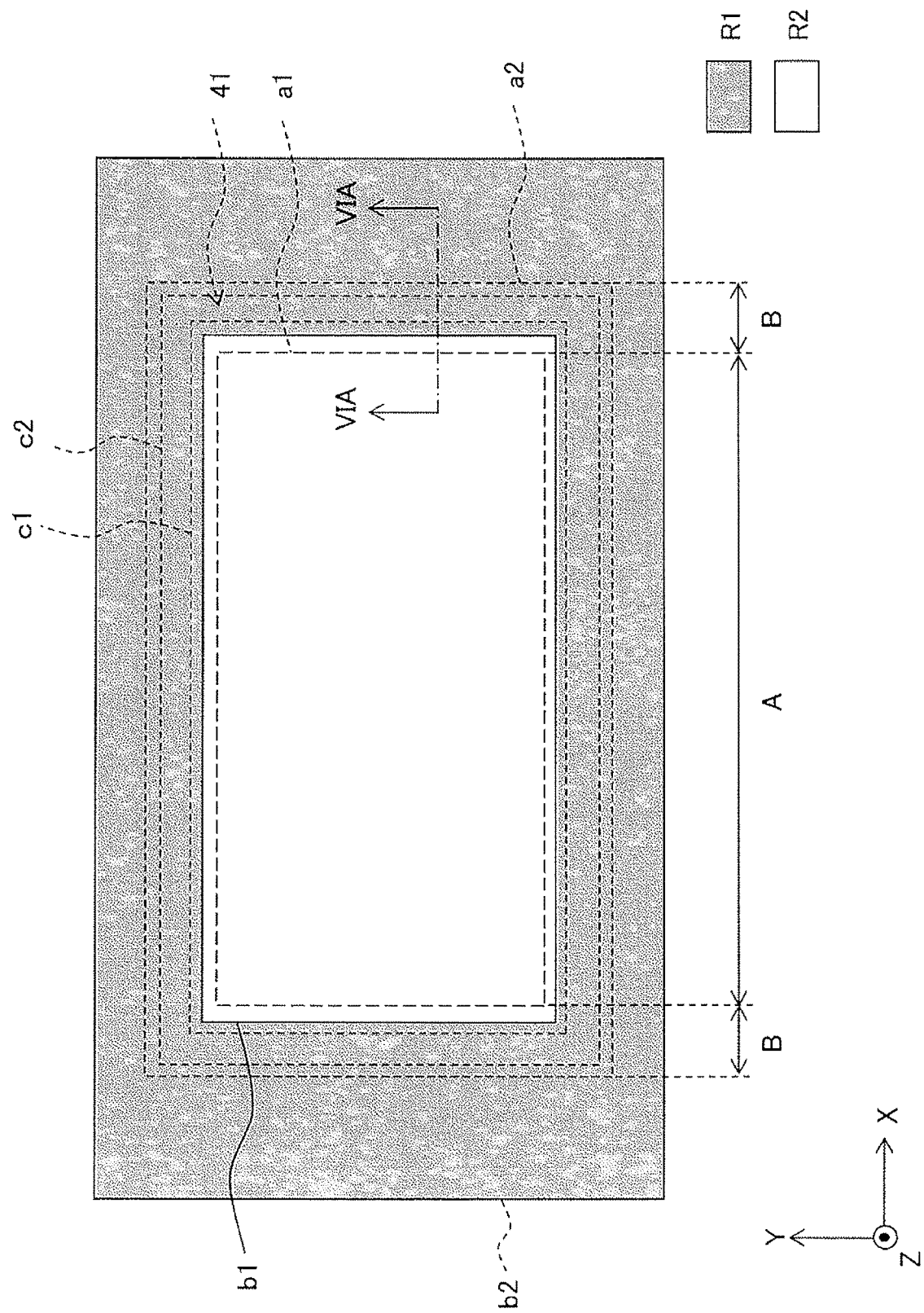

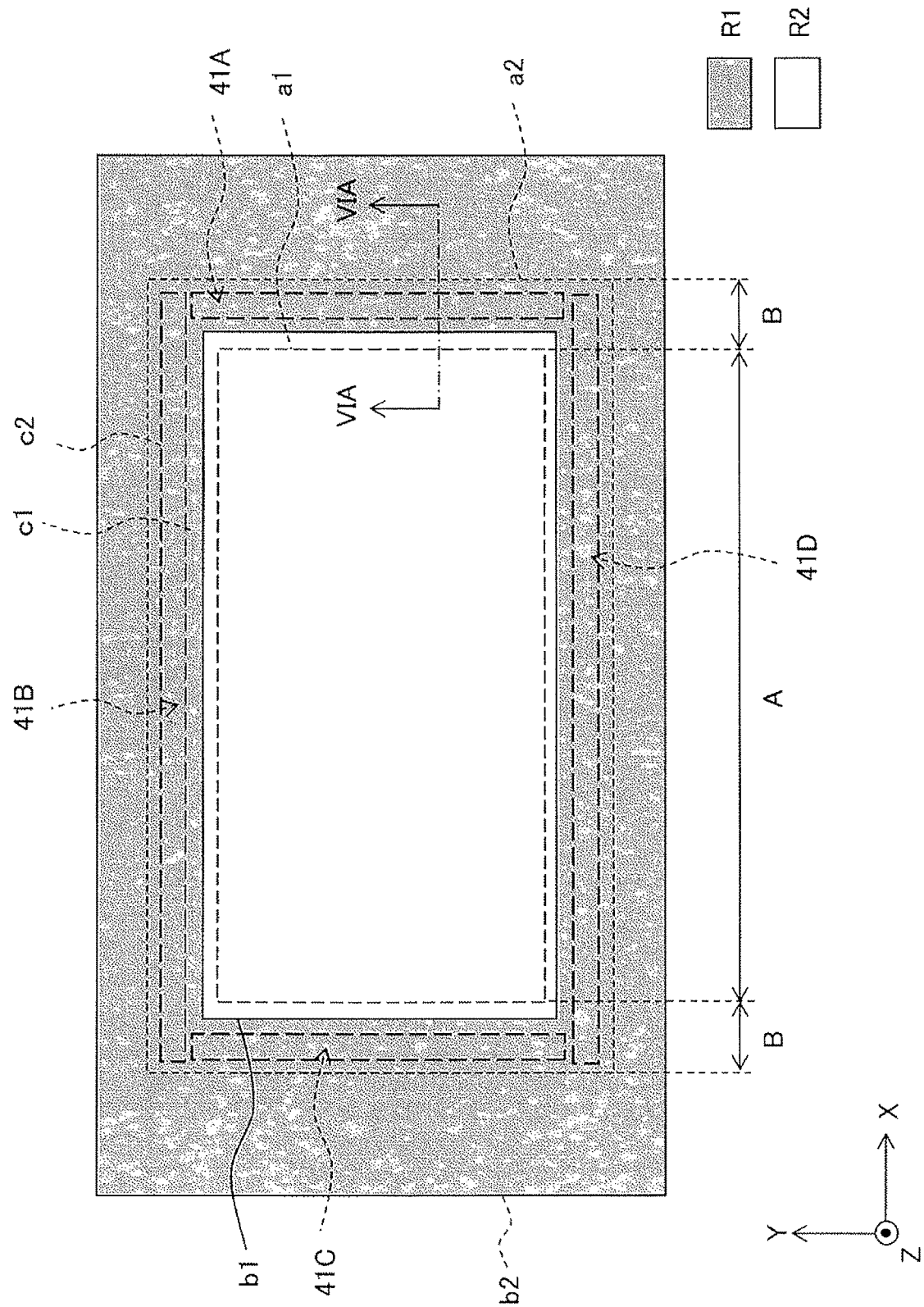
[ FIG. 6C ]

[ FIG. 7 ]
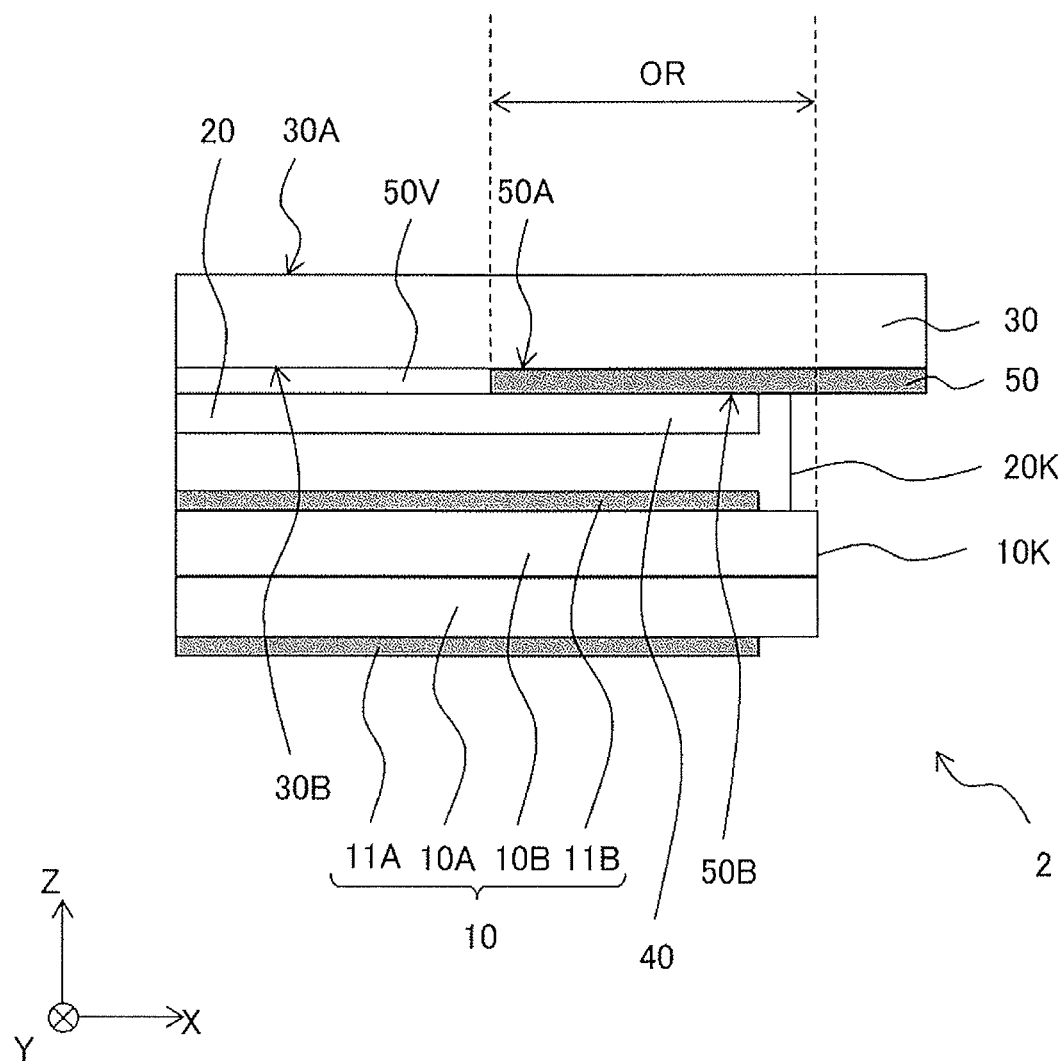

[ FIG. 8 ]
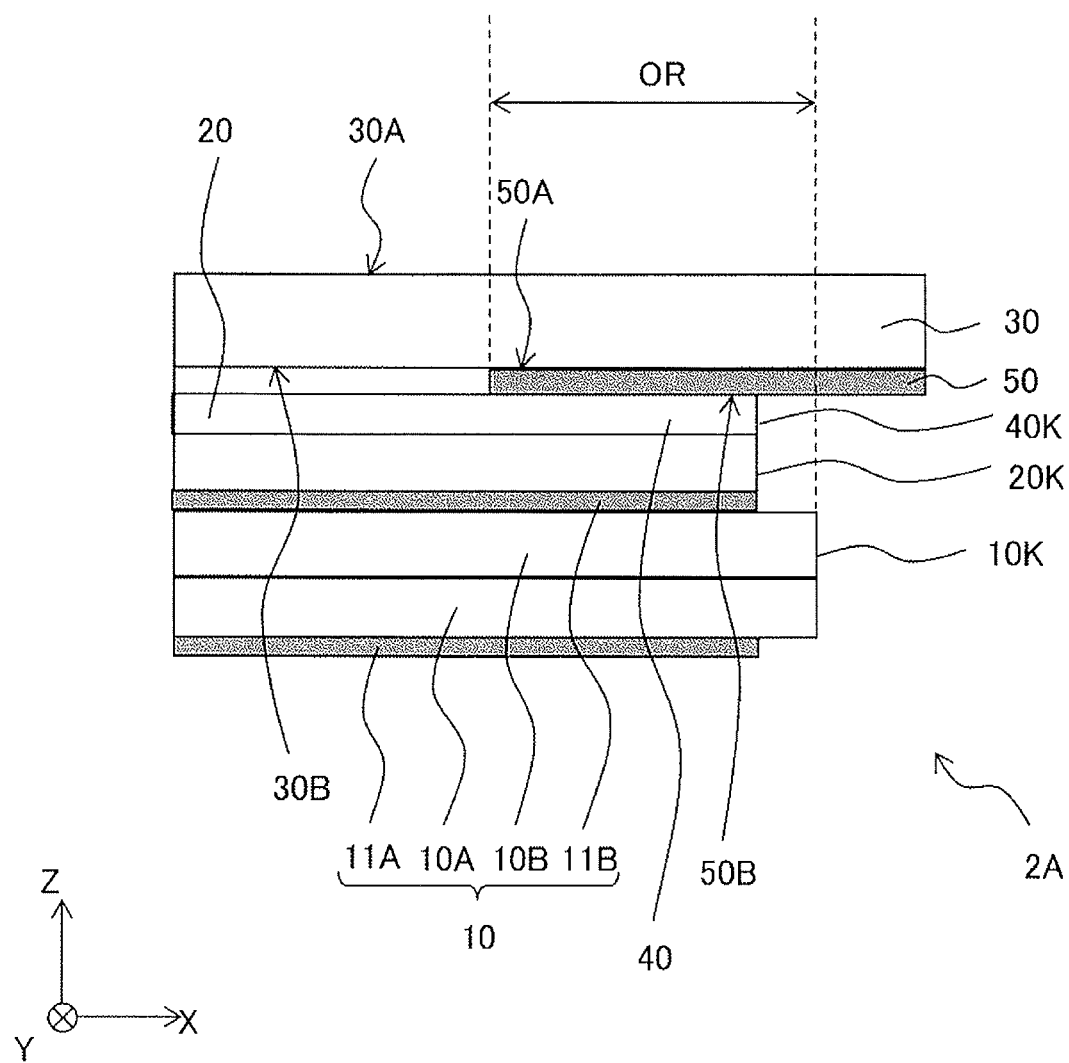

[ FIG. 9 ]
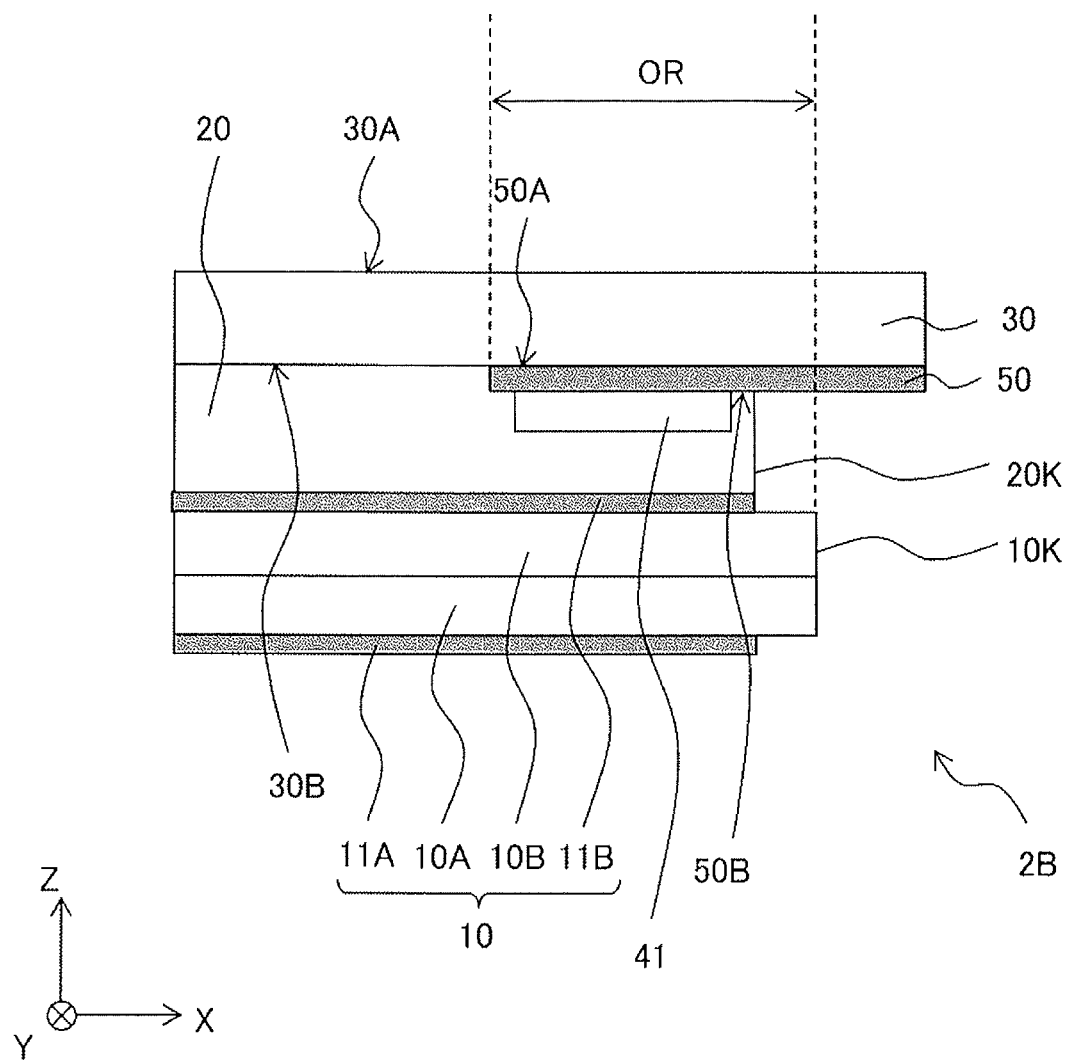

[ FIG. 10 ]
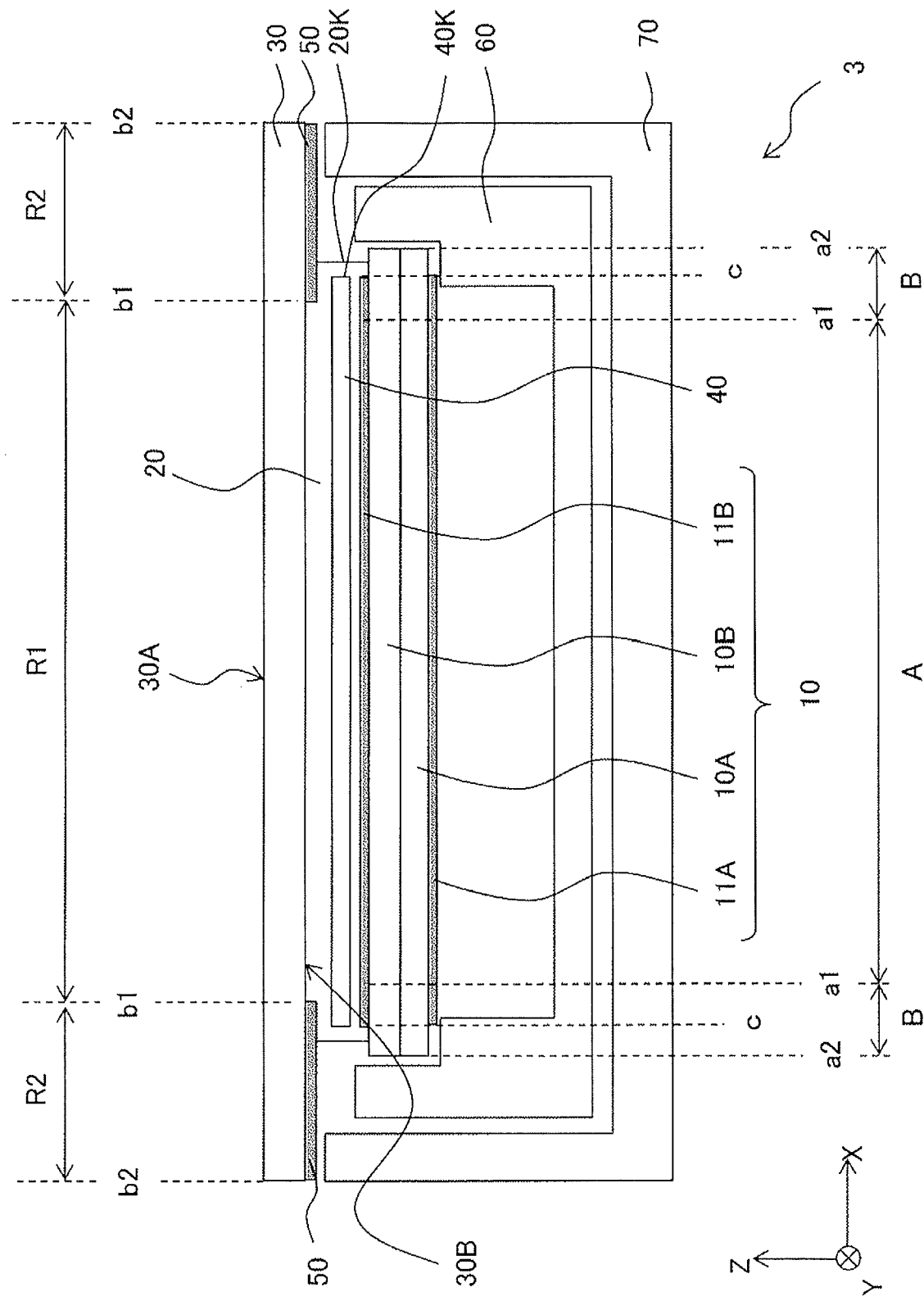

[ FIG. 11 ]
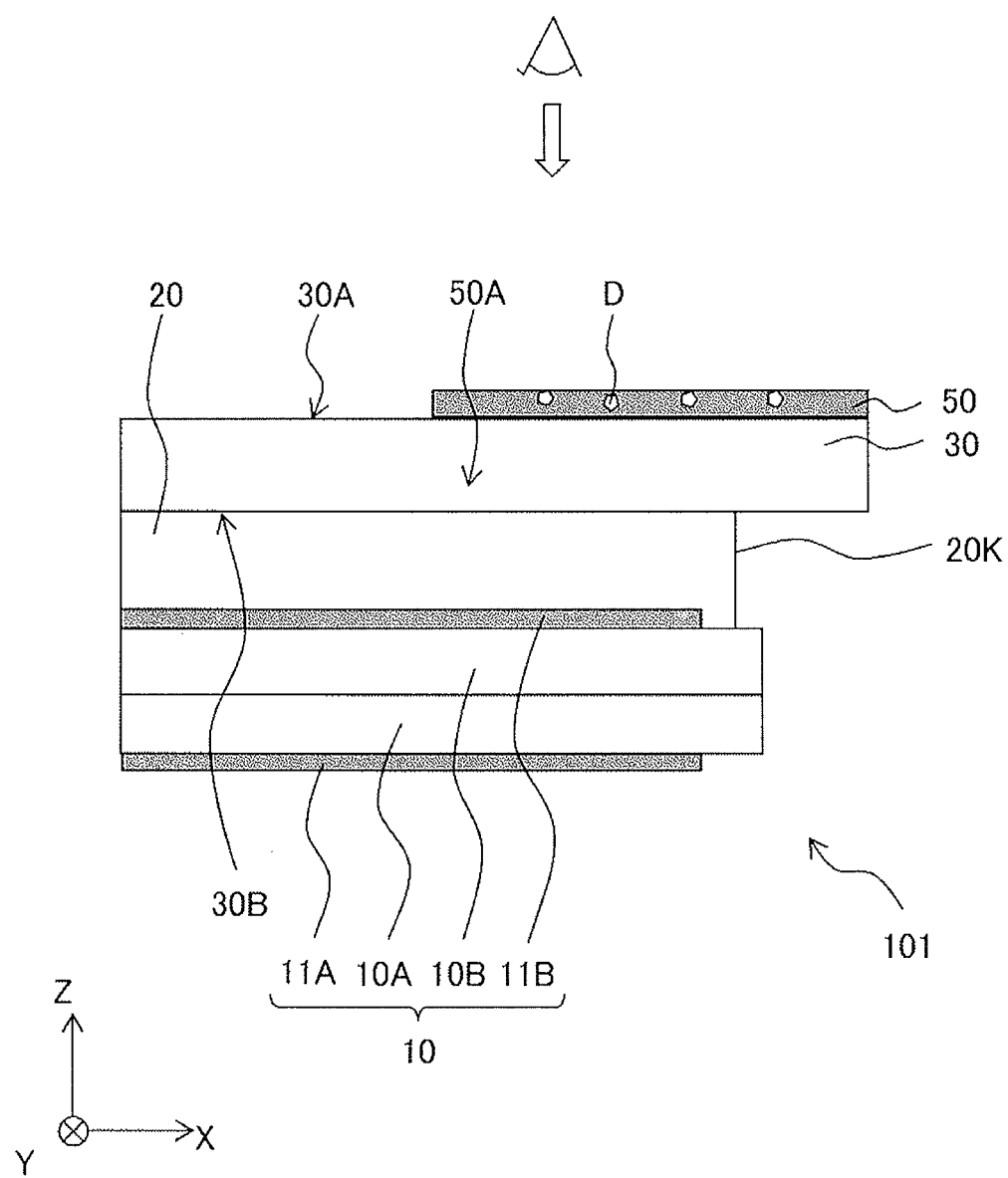

DISPLAY APPARATUS, DISPLAY UNIT, AND TRANSPARENT PLATE UNIT

CROSS-REFERENCE TO RELATED APPLICATIONS

This application is a national phase entry under 35 U.S.C. § 371 of International Application No. PCT/JP2016/077276 filed Sep. 15, 2016, which claims the priority from Japanese Patent Application No. 2015-219555, filed in the Japanese Patent Office on Nov. 9, 2015, the entire contents of which are hereby incorporated by reference.

TECHNICAL FIELD

The disclosure relates to a display apparatus such as a television, and to a display unit and a transparent plate unit each used in the display unit.

BACKGROUND ART

Recently, for example, a display apparatus such as a liquid crystal or organic EL (Electroluminescence) type is used as a display monitor of a flat screen television, a notebook personal computer, or a car navigation system, for example. It is known, in terms of surface protection and design, that such a display apparatus may include a front panel configured by a transparent substrate of plastic or glass, for example, provided on front side (display side) of the display panel (for example, see PTLs 1 to 6).

In some cases, the front panel used in this example may be subjected to a light shielding treatment (a light shielding layer may be formed) in a region facing a non-display part (bezel part) in terms of image quality improvement and design. Specifically, the light shielding layer is formed in a frame-shaped region along a periphery of the front panel by, for example, vapor deposition or printing of a light-shielding material or by joining of an opaque sheet material.

CITATION LIST

Patent Literature

PTL 1: Japanese Unexamined Patent Application Publication No. H03-204616
PTL 2: Japanese Unexamined Patent Application Publication No. H06-337411
PTL 3: Japanese Unexamined Patent Application Publication No. 2005-55641
PTL 4: Japanese Unexamined Patent Application Publication No. 2008-281997
PTL 5: Japanese Unexamined Patent Application Publication No. 2012-113228
PTL 6: Japanese Unexamined Patent Application Publication No. 2014-235185

SUMMARY OF THE INVENTION

Incidentally, when a foreign matter is mixed into a light shielding layer of a front panel as described above, it is often visually recognized by an observer.

It is thus desirable to provide a display apparatus having a structure suitable for improvement in production yield, and a display unit and a transparent plate unit each used in the display apparatus.

A display apparatus according to an embodiment of the disclosure includes a display panel, a transparent plate having an opposite surface that faces the display panel, and a light shielding layer provided in a peripheral part of the opposite surface of the transparent plate.

A display unit according to an embodiment of the disclosure is to be joined to a transparent plate with a light shielding layer being formed in a peripheral part, and includes a display panel and a light guide member provided in at least a portion of an overlapping region of the light shielding layer and the display panel, between the display panel and the transparent plate.

A transparent plate unit according to an embodiment of the disclosure is to be joined to a display panel, and includes a transparent plate including an opposite surface that faces the display panel, a light shielding layer provided in a peripheral part of the opposite surface of the transparent plate, and a light guide member disposed to face the transparent plate, with the light shielding layer being interposed therebetween.

In the display apparatus, the display unit, and the transparent plate unit according to the respective embodiments of the disclosure, the light shielding layer is provided on the opposite surface, of the transparent plate, that faces the display panel. Thus, even when a foreign matter is mixed into the light shielding layer, the foreign matter is less likely to be visually recognized.

According to the display apparatus, the display unit, and the transparent plate unit of the respective embodiments of the disclosure, it is possible to achieve a structure suitable for improvement in production yield.

BRIEF DESCRIPTION OF DRAWINGS

FIG. 1 is a cross-sectional view of a configuration of a display apparatus according to a first embodiment of the disclosure.
FIG. 2 is a plan view of the configuration of the display apparatus illustrated in FIG. 1 as viewed from a light shielding layer.
FIG. 3 is an enlarged cross-sectional view of a main part of the display apparatus illustrated in FIG. 1.
FIG. 4A is a cross-sectional view of one process step of a method of manufacturing the display apparatus illustrated in FIG. 1.
FIG. 4B is a cross-sectional view of one process step subsequent to FIG. 4A FIG. 4C is a cross-sectional view of one process step subsequent to FIG. 4B.
FIG. 4D is an enlarged cross-sectional view of the process step illustrated in FIG. 4C.
FIG. 5 is a cross-sectional view of a first modification example of the display apparatus illustrated in FIG. 1.
FIG. 6A is a cross-sectional view of a second modification example of the display apparatus illustrated in FIG. 1.
FIG. 6B is a plan view of the second modification example of the display apparatus illustrated in FIG. 1.
FIG. 6C is a plan view of a third modification example of the display apparatus illustrated in FIG. 1.
FIG. 7 is a cross-sectional view of a configuration of a display apparatus according to a second embodiment of the disclosure.
FIG. 8 is a cross-sectional view of a first modification example of the display apparatus illustrated in FIG. 7.
FIG. 9 is a cross-sectional view of a second modification example of the display apparatus illustrated in FIG. 7.
FIG. 10 is a cross-sectional view of the display apparatus according to another modification example of the disclosure.

FIG. 11 is an enlarged cross-sectional view of a main part of a display apparatus according to a comparative example.

MODES FOR CARRYING OUT THE INVENTION

In the following, some embodiments of the disclosure are described in detail with reference to the drawings. The description is given in the following order. It is to be noted that the disclosure is not limited to the following examples and that a known configuration may also be added thereto where appropriate.
1. First Embodiment:
  An example of a display apparatus including a display unit provided with a light guide member on a display panel.
2. First Modification Example of First Embodiment:
  An example in which an end surface of the light guide member is exposed to the outside.
3. Second and Third Modification Examples of First Embodiment:
  Examples of a display apparatus provided with a frame-shaped light guide member.
4. Second Embodiment and Modification Example Thereof:
  Examples of a display apparatus including a transparent plate unit provided with the light guide member on a transparent substrate.
5. Other Modification Examples

1. First Embodiment

[Configuration of Display Apparatus 1]

A configuration of a display apparatus 1 according to a first embodiment of the disclosure is described with reference to FIGS. 1 to 3. FIG. 1 schematically illustrates a cross-sectional configuration of the display apparatus 1. The display apparatus 1 is, for example, a liquid crystal display apparatus used as a display monitor of a television, a notebook personal computer, or a car navigation system, for example, and includes a light guide member 40, a resin layer 20, a light shielding layer 50, and a transparent substrate 30, in this order, on front surface side (light emission side) of the display panel 10. A backlight unit 60 is provided on back side (light incident side) of the display panel 10. The display panel 10 and the backlight unit 60 are disposed in an exterior member 70. Moreover, the display panel 10 configures a display unit together with the light guide member 40. FIG. 2 illustrates a planar configuration of the display apparatus 1 illustrated in FIG. 1 as viewed from side of the light shielding layer 50. In FIG. 2, however, the transparent substrate 30 is omitted. FIG. 1 is a cross-sectional view in a direction of an arrow taken along a cutting line I-I illustrated in FIG. 2. FIG. 3 is an enlarged cross-sectional view of a main part of the display apparatus 1.

The display panel 10 is a liquid crystal display panel that displays an image on the basis of illumination light from the backlight unit 60, and is of an active matrix type for displaying the image for each pixel on the basis of an image signal transmitted from a data driver (not illustrated) by means of a drive signal supplied from a gate driver (not illustrated). The display panel 10 includes pixels (not illustrated) that are arranged in 3,840 columns or more in an X direction and 2,160 rows or more in a Y direction, for example. Each pixel includes a red subpixel that emits red light, a green subpixel that emits green light, and a blue subpixel that emits blue light. The display panel 10 seals, between a drive substrate 10A and an opposite substrate 10B, an unillustrated liquid crystal layer. Film-like polarizing plates 11A and 11B as optical films, for example, are joined to external surfaces of the drive substrate 10A and the opposite substrate 10B, respectively. The drive substrate 10A includes a TFT (Thin Film Transistor) that drives each pixel, a drive circuit that supplies image signals and so forth to each pixel, and a wiring substrate for external coupling, which are disposed on a glass substrate, for example. The opposite substrate 10B includes respective color filters of unillustrated three primary colors (R, G, B) that are formed on a glass substrate for each pixel, for example. The liquid crystal layer to be used includes a nematic liquid crystal in a VA (Vertical Alignment) mode, in a TN (Twisted Nematic) mode, in an IPS (In Plane Switching) mode, for example. It is to be noted that the drive substrate 10A and the opposite substrate 10B may not necessarily be provided in this order. Moreover, the color filter may not particularly be provided. Alternatively, the color filter may be provided not on the opposite substrate 10B but on the drive substrate 10A. Furthermore, it is also possible to use a driving element other than the TFT.

As illustrated in FIG. 2, in the display panel 10, a periphery of a display region A (a rectangular region surrounded by an outer edge a1) serves as a peripheral region B (a frame-shaped region between the outer edge a1 and an outer edge a2 of the display panel 10). A plurality of pixels are disposed in matrix on the display region A, and the drive circuit for driving of each pixel, the wiring substrate for external coupling, and so forth as described above are disposed in the peripheral region B. The drive substrate 10A and the opposite substrate 10B are joined to each other in a portion of the peripheral region B along the outer edge a2 by means of an adhesive (not illustrated), for example.

The resin layer 20 has a function of suppressing interface reflection between the display panel 10 and the transparent substrate 30, and is provided to improve resistance to impact. The resin layer 20 includes, for example, a resin based on silicone, epoxy, or acrylic, etc., that is cured by ultraviolet light or visible light (hereinbelow, photocurable resin), and preferably includes an acrylic-based resin. Preferable examples of the acrylic-based resin include a resin composition that includes an oligomer, an acrylic monomer, a photopolymerization initiator, and a plasticizer. Examples of the oligomer include polyurethane acrylate, polyisoprene-based acrylate, polyester acrylate, and epoxy acrylate. Preferable examples of the acrylic monomer include a mono-functional acrylic monomer such as isobornyl acrylate, benzyl acrylate, and 2-hydroxyethyl methacrylate. It is to be noted that the resin layer 20 desirably covers also the outer edge of the polarizing plate 11B, as illustrated in FIG. 1. One reason for this is that exposure of the polarizing plate 11B is prevented to sufficiently protect the polarizing plate 11B.

The transparent substrate 30 is a so-called front panel that is disposed for the purpose of surface protection and design improvement of the display panel 10. The transparent substrate 30 has a thickness of, for example, about 0.2 mm to about 5.0 mm, and includes glass or plastic, for example. Examples of the plastic include acrylic and polycarbonate. Particularly for application of a large display, however, it is desirable to use a glass material in terms of dimensional stability. Moreover, either a non-reflection treatment or a low-reflection treatment may be preferably performed on a surface on front surface side (observation side or light emission side) of the transparent substrate 30.

An external dimension of the transparent substrate 30 is larger than the external dimension of the display panel 10, and an outer edge b2 of the transparent substrate 30 overhangs about 5 mm to about 100 mm, for example, outward from the outer edge a2 of the display panel 10. A rectangular region facing the display region A of the transparent substrate 30 serves as a translucent region R1 that transmits display light therethrough.

The light shielding layer 50 is disposed in a frame-shaped light shielding region R2, on a back surface 30B of the transparent substrate 30, that faces the peripheral region B for the purpose of improvement in image quality and design. The back surface 30B is a surface, of the transparent substrate 30, that faces the display panel 10. The light shielding region R2 is a region that surrounds the translucent region R1 in an XY plane. The light shielding layer 50 has a thickness of, for example, about 0.1 µm to about 100 µm, and includes an opaque material such as carbon black, metal, pigment, and dye. An inner edge b1 of the light shielding layer 50 is preferably located outer than the outer edge a1 that is a boundary between the display region A and the peripheral region B of the display panel 10. This makes it possible to prevent pixels of the display panel 10 from being shielded by the light shielding layer 50 when observing the display apparatus 1 from a diagonal direction.

The light guide member 40 includes an end surface 40K, and includes a plate-like transparent material. The light guide member 40 is inserted between, for example, the polarizing plate 11B of the display panel 10 and the resin layer 20. When the display panel 10 and the transparent substrate 30 are joined together, the light guide member 40 guides external light (such as ultraviolet light) from the end surface 40K and functions to effectively apply light to the photocurable resin that configures the resin layer 20. The light guide member 40 is disposed to occupy at least a portion of an overlapping region OR of the light shielding layer 50 and the display panel 10, out of the space interposed between the display panel 10 and the transparent substrate 30.

Moreover, in the example illustrated in FIG. 1, the light guide member 40 is disposed to uniformly occupy also the translucent region R1 surrounded by the light shielding region R2 of the transparent substrate 30, where the light shielding layer 50 is provided.

The backlight unit 60 illuminates the display panel 10 from its back surface directly or via an optical member such as a light guide plate, using, as a light source, a fluorescent lamp such as a CCFL (Cold Cathode Fluorescent Lamp), a light emitting diode (LED: Light Emitting Diode), or a laser (LASER: light amplification by stimulated emission of radiation), for example.

[Method of Manufacturing Display Apparatus 1]

The display apparatus 1 may be manufactured in the following manner, for example. FIGS. 4A to 4C illustrate a portion of the method of manufacturing the display apparatus 1 in the order of the process steps.

First, the display panel 10 is fabricated as illustrated in FIG. 4A. Specifically, the drive substrate 10A provided with the TFT, the drive circuit, and so forth is joined to the opposite substrate 10B including a color filter, with the liquid crystal layer being interposed therebetween. Thereafter, the polarizing plate 11A and the polarizing plate 11B are joined to external surfaces of the drive substrate 10A and the opposite substrate 10B, respectively. Furthermore, the light guide member 40 is placed on the polarizing plate 11B. In this situation, the polarizing plate 11B and the light guide member 40 may be fixed by means of adhesion, for example.

Meanwhile, as illustrated in FIG. 4B, the light shielding layer 50 is formed on a front surface 30A of the transparent substrate 30. Specifically, the light shielding layer 50 is provided on the back surface 30B of the transparent substrate 30, by printing a predetermined opaque material dispersed or dissolved in a binder, or by directly vapor-depositing the opaque material, for example. Alternately, a transparent film 51 on which the light shielding layer 50 is printed may be joined to the whole back surface 30B of the transparent substrate 30, for example.

It is to be noted that the non-reflection treatment or the low-reflection treatment may be preferably performed on the front surface 30A of the transparent substrate 30. It is possible for these treatments to be performed by, for example, vapor-depositing or coating a non-reflective material or a low-reflective material, or by joining a non-reflective film or a low-reflective film, for example.

Subsequently, as illustrated in FIGS. 4C and 4D, the display panel 10 including the light guide member 40 and the transparent substrate 30 including the light shielding layer 50 are overlapped, for example, via a resin 21 in a liquid state having photocurability. In this situation, a portion of the light guide member 40 is made to overlap a portion of the light shielding layer 50. That is, a vicinity of the outer edge of the light guide member 40 is made to be included in the overlapping region OR (see FIG. 4D). Thereafter, light L in a wavelength range that cures the resin 21, such as ultraviolet light and visible light, is applied from both of the front surface 30A of the transparent substrate 30 and an end surface 21K of the resin 21. Specifically, it suffices to use light having a wavelength to which a photoinitiator in the resin 21 is sensitive. It is to be noted that, for example, a lamp with its light emission center of 365 nm or 405 nm or an LED having such an emission wavelength may be preferably used, in terms of productivity. Moreover, illuminance and light amount of the light L may be set depending on the composition and the thickness, for example, of the resin material used as the resin 21. It is desirable that the resin 21 be applied with a film thickness as uniform as possible by a method such as slit coating, roll coating, screen printing, and stencil printing. Curing the resin 21 by applying the light L in this manner allows for forming of the resin layer 20, resulting in joining of the display panel 10 and the transparent substrate 30 together.

After thus joining the transparent substrate 30 to the display panel 10, with the resin layer 20 being interposed therebetween, the display panel 10 and the transparent substrate 30 that are joined together are disposed in the exterior member 70 together with the backlight unit 60. The display apparatus 1 illustrated in FIG. 1 is completed as described above.

[Workings and Effects of Display Apparatus 1]

In the display apparatus 1, when light enters the display panel 10 from the backlight unit 60, the incident light passes through the polarizing plate 11A, and then is transmitted through the unillustrated liquid crystal layer while being modulated for each pixel, on the basis of an image voltage applied between the drive substrate 10A and the opposite substrate 10B. The light having been transmitted through the liquid crystal layer passes through the opposite substrate 10B including the color filter that is unillustrated, whereby the transmitted light is extracted to the outside of the polarizing plate 11B as color display light.

In the display apparatus 1, the light shielding layer 50 is disposed on the back surface 30B, of the transparent substrate 30, that faces the display panel 10. Therefore, even when a foreign matter D is mixed into the light shielding layer 50, the foreign matter is less likely to be visually recognized upon being viewed by an observer from the front surface 30A of the transparent substrate 30 (see FIG. 4D). In more detail, the foreign matter D is more likely to be visually recognized by the observer in a case where the foreign matter D is exposed on a front surface 50A (a surface that faces the back surface 30B) of the light shielding layer 50. In other cases such as a case where the foreign matter D is exposed to a rear surface 50B and a case where the foreign matter D is embedded in the light shielding layer 50, however, the foreign matter D is less likely to be visually recognized by the observer. Accordingly, the display apparatus 1 makes it possible to achieve a structure suitable for improvement in production yield.

In contrast, in a display apparatus 101 illustrated in FIG. 11 as a comparative example, the light shielding layer 50 is formed on the front surface 30A of the transparent substrate 30. Therefore, the foreign matter D is more likely to be visually recognized no matter where in the light shielding layer 50 the foreign matter D is present, upon being viewed by the observer from the front surface 30A of the transparent substrate 30.

Moreover, when joining the transparent substrate 30 and the display panel 10 together, the photocurable resin 21 is filled between the transparent substrate 30 and the display panel 10, and is cured by applying light having a predetermined wavelength (light L) to the resin 21. Here, in a case where the light shielding layer 50 is provided on the back surface 30B of the transparent substrate 30, there is a possibility that quick curing of the resin 21 may be prevented when the light L is applied only from the front surface 30A of the transparent substrate 30. One reason for this is that a portion of the light L is prevented from reaching the resin 21 by being shielded by the light shielding layer 50. Therefore, a method of causing the light L to be incident also from the end surface 21K of the resin 21 is employed. In a case where the resin 21 is relatively thin, however, there is a possibility that the light L having been incident from the end surface 21K may not reach the resin 21 near the inner edge b1 of the light shielding layer 50, or that intensity of the light L may be insufficient even when the light L reaches there. In such a case, curing of the resin 21 may be insufficient near the inner edge b1 of the light shielding layer 50, which may cause occurrence of display unevenness.

Thus, the display apparatus 1 according to the present embodiment has a configuration in which the light guide member 40 is provided to occupy at least a portion of the overlapping region OR of the light shielding layer 50 and the display panel 10. The light guide member 40 allows the light L having been incident from the end surface 21K to propagate in the XY plane, whereby the light L with sufficient intensity is applied to the resin 21 that occupies the overlapping region OR (resin 21 in a circle 21R illustrated in FIG. 4D). As a result, curing of the resin 21 is promoted to prevent its non-curing, thereby allowing for formation of the resin layer 20 having substantially uniform optical properties. Thus, it becomes possible to eliminate occurrence of the display unevenness.

2. First Modification Example of First Embodiment

[Configuration of Display Apparatus 1A]

FIG. 5 illustrates a cross-sectional configuration of a main part of a display apparatus 1A according to a first modification example of the foregoing first embodiment. The display apparatus 1A has a configuration similar to that of the display apparatus 1 except that the end surface 40K of the light guide member 40 is exposed without being covered by the resin layer 20. It is to be noted that, although FIG. 5 illustrates an example in which the location of the end surface 40K coincides with the location of an end surface 20K of the resin layer 20, their locations may be different.

[Workings and Effects of Display Apparatus 1A]

As described above, the display apparatus 1A has a configuration in which the end surface 40K of the light guide member 40 is exposed without being covered by the resin layer 20, thus making it possible to cure the resin 21 more efficiently when joining the display panel 10 and the transparent substrate 30 together through formation of the resin layer 20. That is, the display apparatus 1A enables the light L that promotes curing of the resin 21 to propagate inside the light guide member 40 from the end surface 40K toward the display region A without being blocked by the resin layer 20. Therefore, as compared with the display apparatus 1 with the end surface 40K being covered by the resin layer 20, the display apparatus 1A enables more intense light to be applied to the resin 21 that occupies the overlapping region OR while suppressing reduction in intensity of the light L.

3. Second Modification Example of First Embodiment

[Configuration of Display Apparatus 1B]

FIG. 6A illustrates a cross-sectional configuration of a main part of a display apparatus 1B according to a second modification example of the foregoing first embodiment. The display apparatus 1B has a configuration similar to that of the display apparatus 1 except that the display apparatus 1B includes a light guide member 41 instead of the light guide member 40. In the display apparatus 1 according to the foregoing first embodiment, the light guide member 40 is a plate member having a rectangular planar shape, and covers also the polarizing plate 11B in the display region A. In contrast, in the display apparatus 1B, the light guide member 41 is provided only in the overlapping region OR. That is, as illustrated in FIG. 6B, for example, the display apparatus 1B has a frame-shaped planar shape that extends to overlap the light shielding layer 50. It is to be noted that FIG. 6B illustrates the planar configuration of the display apparatus 1B illustrated in FIG. 5A as viewed from side of the light shielding layer 50. In FIG. 6B, however, the transparent substrate 30 is omitted. FIG. 6A is a cross-sectional view in a direction of an arrow taken along a cutting line VIA-VIA illustrated in FIG. 6B. It is to be noted that, as illustrated in FIG. 6C as another modification example (third modification example), a plurality of light guide members 41A to 41D may be discretely disposed instead of the light guide member 41 having a frame shape.

[Workings and Effects of Display Apparatus 1B]

As described above, the display apparatus 1B has a configuration in which the light guide member 41 is disposed in the overlapping region OR, thus allowing the light L with sufficient intensity to be also applied to the resin 21 that occupies the overlapping region OR when forming the resin layer 20 adjacent to the light guide member 41, making it possible to prevent non-curing of the resin 21. Meanwhile, the light guide member 41 is not present in regions other than the overlapping region OR, thus making it possible to reduce the weight as compared with the above-described display apparatuses 1 and 1A.

4. Second Embodiment

[Configuration of Display Apparatus 2]

FIG. 7 illustrates a cross-sectional configuration of a main part of a display apparatus 2 according to a second embodiment of the technology. In the display apparatus 1 according to the foregoing first embodiment and the display apparatuses 1A and 1B according to its modification examples, the light guide member 40 is provided between the display panel 10 and the resin layer 20. In contrast, the display apparatus 2 has a configuration in which the light guide member 40 is provided to be in contact with the rear surface 50B of the light shielding layer 50 provided on the back surface 30B of the transparent substrate 30 (between the transparent substrate 30 and the resin layer 20). In the display apparatus 2, the transparent substrate 30, the light shielding layer 50, and the light guide member 40 configure a transparent plate unit. The light guide member 40 is disposed to face the transparent substrate 30, with the light shielding layer 50 being interposed therebetween. A space surrounded by the transparent substrate 30, the light shielding layer 50, and the light guide member 40 may include a transparent material layer or an air layer. The display apparatus 2 has a configuration similar to that of the display apparatus 1 except that a location in which the light guide member 40 is disposed is different from that in the display apparatus 1.

[Workings and Effects of Display Apparatus 2]

The display apparatus 2 according to the present embodiment has a configuration in which the light shielding layer 50 is provided on the back surface 30B of the transparent substrate 30, thus allowing for expectation of improvement in production yield, as with the display apparatus 1. Moreover, the display apparatus 2 has a configuration in which the light guide member 40 is provided to be in contact with the rear surface 50B of the light shielding layer 50, thus making it possible to promote curing of the resin 21 when forming the resin layer 20, regardless of the configuration of the display panel 10. One reason for this is that propagation of the light L inside the light guide member 40 is less likely to be blocked due to the light guide member 40 being spaced apart from the display panel 10. Moreover, provision of the light guide member 40 at a location spaced apart from the display panel 10 allows for reduction in distortion, for example, caused by mechanical load on the display panel 10, as compared with a case where the light guide member 40 is joined to the display panel 10. This makes it possible to eliminate a cause of degradation in display quality of the display panel 10.

In the present embodiment as well, the end surface 40K of the light guide member 40 may be exposed without being covered by the resin layer 20, as in a display apparatus 2A according to a first modification example illustrated in FIG. 8, for example. In such a case, the location of the end surface 40K either may coincide with or may differ from the location of the end surface 20K of the resin layer 20.

Moreover, the light guide member 41 having a frame shape may be provided only in the overlapping region OR instead of the light guide member 40, as in a display apparatus 2B according to a second modification example illustrated in FIG. 9, for example. In such a case, the light guide member 41 having the frame shape may be divided into a plurality of pieces to be disposed.

Although description has been described above with reference to some embodiments and their modification examples, the disclosure is not limited to the foregoing embodiments, etc., and may be modified in a variety of ways. For example, the materials and the thicknesses of the respective layers described in the foregoing embodiments, etc. are not limitative; other materials and thicknesses may also be employed.

Moreover, although the foregoing embodiments, etc. are described by exemplifying a case of using the liquid crystal display panel as the display panel 10, the disclosure is also applicable to a case of using another type of the display panel 10 such as an organic EL (Electroluminescence) panel and a plasma display panel. In a case where such a different type of the display panel is used, it is possible to avoid degradation of image quality due to non-curing of the resin layer 20.

Moreover, although the foregoing embodiments, etc. are described by exemplifying a case where the light guide member is a planar or frame-shaped transparent member having a homogeneous optical action, the disclosure is not limited thereto. For example, an optical device that exhibits an optical function such as a pattern retarder, a lenticular lens, a liquid crystal layer barrier, and a parallax barrier may be used as the light guide member. The display apparatus including both such a light guide member and a display panel that displays a plurality of viewpoint images is usable as a stereoscopic display apparatus having a stereoscopic display function, as a result of the light guide member exhibiting, for example, a function of optically separating the plurality of viewpoint images displayed on the display panel to allow for stereoscopic vision.

Moreover, an optical device that has various optical functions such as a touch panel, a light diffusion sheet having a function of increasing a viewing angle, a prism sheet or lens sheet having a light condensing function, and an anti-reflection sheet may also be used as the light guide member. Furthermore, a combination of two or more of these optical devices that have respective optical functions may also be used.

Moreover, although the foregoing embodiments, etc. are described by exemplifying a case where the light guide member 40 or 41 is in contact with the polarizing plate 11B or the light shielding layer 50, the disclosure is not limited thereto. For example, the light guide member 40 may be embedded in the resin layer 20, and a periphery of the light guide member 40 may be surrounded by the resin layer 20, as in a display apparatus 3 according to another modification example illustrated in FIG. 10.

Moreover, the technology may have the following configuration.

(1)

A display apparatus, including:
a display panel;
a transparent plate including an opposite surface that faces the display panel; and
a light shielding layer provided in a peripheral part of the opposite surface of the transparent plate.

(2)

The display apparatus according to (1), further including:
a resin layer provided between the display panel and the light shielding layer; and
a light guide member provided to occupy at least a portion of an overlapping region of the light shielding layer and the display panel, out of a space interposed between the display panel and the transparent plate.

(3)

The display apparatus according to (2), in which the light guide member is provided between the display panel and the resin layer, provided between the transparent plate and the resin layer, or embedded in the resin layer.

(4)

The display apparatus according to (2) or (3), in which the light guide member includes a part that is exposed to outside.

(5)

The display apparatus according to any one of (2) to (4), in which the light guide member is provided to occupy also a central region surrounded by a light shielding region occupied by the light shielding layer in the transparent plate.

(6) The display apparatus according to any one of (2) to (5), in which the display panel displays a plurality of viewpoint images, and the light guide member has a function of optically separating the plurality of viewpoint images displayed on the display panel to allow for stereoscopic vision.

(7) The display apparatus according to (6), in which the light guide member includes a pattern retarder, a lenticular lens, a liquid crystal layer barrier, or a parallax barrier.

(8) The display apparatus according to any one of (2) to (5), in which the light guide member includes a touch panel, a light diffusion sheet, a prism sheet, a lens sheet, or an anti-reflection sheet.

(9) The display apparatus according to any one of (2) to (4), in which the light guide member is provided only in the overlapping region.

(10) A display unit to be joined to a transparent plate with a light shielding layer being formed in a peripheral region, the display unit including:

a display panel; and a light guide member provided in at least a portion of an overlapping region of the light shielding layer and the display panel, between the display panel and the transparent plate.

(11) A transparent plate unit to be joined to a display panel, the transparent plate unit including:

a transparent plate including an opposite surface that faces the display panel;

a light shielding layer provided in a peripheral region of the opposite surface of the transparent plate; and a light guide member disposed to face the transparent plate, with the light shielding layer being interposed therebetween.

This application claims the benefit of Japanese Priority Patent Application No. 2015-219555 filed with the Japan Patent Office on Nov. 9, 2015, the entire contents of which are incorporated herein by reference.

It should be understood by those skilled in the art that various modifications, combinations, sub-combinations and alterations may occur depending on design requirements and other factors insofar as they are within the scope of the appended claims or the equivalents thereof.

The invention claimed is:

1. A display apparatus, comprising:
a display panel;
a transparent plate including an opposite surface that faces the display panel;
a light shielding layer provided in a peripheral part of the opposite surface of the transparent plate; and
a light guide member provided to occupy only an overlapping region of the light shielding layer and the display panel, out of a space interposed between the display panel and the transparent plate.

2. The display apparatus according to claim 1, further comprising:
a resin layer provided between the display panel and the light shielding layer.

3. The display apparatus according to claim 2, wherein the light guide member is provided between the display panel and the resin layer, provided between the transparent plate and the resin layer, or embedded in the resin layer.

4. The display apparatus according to claim 2, wherein the light guide member includes a part that is exposed to outside.

5. The display apparatus according to claim 2, wherein the light guide member is provided to occupy also a central region surrounded by a light shielding region occupied by the light shielding layer in the transparent plate.

6. The display apparatus according to claim 2, wherein
the display panel displays a plurality of viewpoint images, and
the light guide member has a function of optically separating the plurality of viewpoint images displayed on the display panel to allow for stereoscopic vision.

7. The display apparatus according to claim 6, wherein the light guide member comprises a pattern retarder, a lenticular lens, a liquid crystal layer barrier, or a parallax barrier.

8. The display apparatus according to claim 2, wherein the light guide member comprises a touch panel, a light diffusion sheet, a prism sheet, a lens sheet, or an anti-reflection sheet.

9. The display apparatus according to claim 2, wherein the light guide member is provided only in the overlapping region.

10. A display unit to be joined to a transparent plate with a light shielding layer being formed in a peripheral region, the display unit comprising:
a display panel; and
a light guide member provided in only an overlapping region of the light shielding layer and the display panel, between the display panel and the transparent plate.

11. A transparent plate unit to be joined to a display panel, the transparent plate unit comprising:
a transparent plate including an opposite surface that faces the display panel;
a light shielding layer provided in a peripheral part of the opposite surface of the transparent plate; and
a light guide member disposed to face the transparent plate, with the light shielding layer being interposed therebetween, and disposed only in an overlapping region of the light shielding layer and the display panel.

12. The display apparatus of claim 1, wherein the transparent plate has a low reflection surface.

13. The display apparatus of claim 1, wherein the transparent plate has a thickness of 0.2 mm to 5.0 mm.

14. A display comprising:
an organic electroluminescence panel; and
a transparent plate unit to be joined to a display panel, the transparent plate unit comprising:
a transparent plate including an opposite surface that faces the display panel, the transparent plate having a thickness of 0.2 mm to 5.0 mm;
a light shielding layer provided in a peripheral part of the opposite surface of the transparent plate; and
a light guide member disposed to face the transparent plate, with the light shielding layer being interposed therebetween, and disposed only in an overlapping region of the light shielding layer and the display panel.

* * * * *